(12) United States Patent
Chen et al.

(10) Patent No.: US 11,977,165 B2
(45) Date of Patent: May 7, 2024

(54) SELF-REFLECTION FILTERING

(71) Applicant: Waymo LLC, Mountain View, CA (US)

(72) Inventors: Mingcheng Chen, Sunnyvale, CA (US); Xiaoxiang Hu, Mountain View, CA (US); Richard Chaussee, Walnut Creek, CA (US)

(73) Assignee: Waymo LLC, Moutain View, CA (US)

( * ) Notice: Subject to any disclaimer, the term of this patent is extended or adjusted under 35 U.S.C. 154(b) by 650 days.

(21) Appl. No.: 16/989,434

(22) Filed: Aug. 10, 2020

(65) Prior Publication Data
US 2022/0043157 A1    Feb. 10, 2022

(51) Int. Cl.
*G01S 17/931* (2020.01)
*G01S 7/497* (2006.01)
*G01S 17/894* (2020.01)
*G05D 1/00* (2006.01)

(52) U.S. Cl.
CPC .......... *G01S 17/931* (2020.01); *G01S 17/894* (2020.01); *G05D 1/0088* (2013.01); *G01S 7/497* (2013.01)

(58) Field of Classification Search
CPC ...... G01S 17/931; G01S 17/894; G01S 7/497; G01S 17/89; G01S 17/86; G05D 1/0088; B60W 60/001; B60W 2420/00; B60W 2420/52; G01C 21/165
USPC .................................................. 701/28, 514
See application file for complete search history.

(56) References Cited

U.S. PATENT DOCUMENTS

| 7,904,222 B2 | 3/2011 | Lee et al. |
| 9,805,274 B2 | 10/2017 | Ayvaci et al. |
| 10,031,231 B2 | 7/2018 | Zermas et al. |
| 10,259,390 B2 | 4/2019 | Zhang et al. |
| 10,298,910 B1 | 5/2019 | Kroeger |

(Continued)

FOREIGN PATENT DOCUMENTS

| CN | 107433905 A | 12/2017 |
| CN | 108318895 A | 7/2018 |
| JP | 2001191964 A | 7/2001 |

OTHER PUBLICATIONS

Huval, Brody, et al., An Empirical Evaluation of Deep Learning on Highway Driving, arXiv: 1504.01716v2, 2015, pp. 1-8.

(Continued)

*Primary Examiner* — Elaine Gort
*Assistant Examiner* — Ellis B. Ramirez
(74) *Attorney, Agent, or Firm* — Botos Churchill IP Law LLP

(57) ABSTRACT

The technology relates to handling of self-reflections of sensor signals off of a portion of a vehicle that is operating in an autonomous driving mode. Vehicle pose information and sensor pose information are determined at a given point in time while operating in the autonomous driving mode. Return signals from one or more scans of the environment are received from onboard sensors such as lidar sensors. The system evaluates, based on the vehicle and sensor pose information, whether a segment between a given one of the one or more sensors and a received point from a selected one of the return signals crosses any surface of a 3D model of the vehicle. The received point is identified as a self-return point. In response to identifying the received point as a self-return point, the vehicle is able to perform a driving operation in the autonomous driving mode.

20 Claims, 17 Drawing Sheets

(56) References Cited

U.S. PATENT DOCUMENTS

| | | |
|---|---|---|
| 10,551,838 B2 | 2/2020 | Liu et al. |
| 2013/0162462 A1 | 6/2013 | Lehning |
| 2016/0358477 A1 | 12/2016 | Ansari |
| 2016/0368336 A1* | 12/2016 | Kahn ................. G01B 11/26 |
| 2017/0341583 A1* | 11/2017 | Zhang ................. B60R 1/00 |
| 2017/0361844 A1 | 12/2017 | Kahn et al. |
| 2018/0057052 A1 | 3/2018 | Dodd et al. |
| 2018/0239000 A1* | 8/2018 | Dussan ............... G01S 7/4865 |
| 2019/0171224 A1 | 6/2019 | Meysel et al. |
| 2020/0041622 A1* | 2/2020 | Juelsgaard ........... G01S 17/87 |
| 2020/0143174 A1* | 5/2020 | Luo ................... B60D 1/62 |
| 2020/0183008 A1* | 6/2020 | Chen .................. G01S 17/89 |
| 2020/0201351 A1* | 6/2020 | Armstrong-Crews ................. G05D 1/0248 |
| 2022/0136823 A1* | 5/2022 | Joshi ................. G01S 7/4817 |

OTHER PUBLICATIONS

The First Office Action for Chinese Patent Application No. 202110895448.4, Jan. 11, 2024.

* cited by examiner

100

150

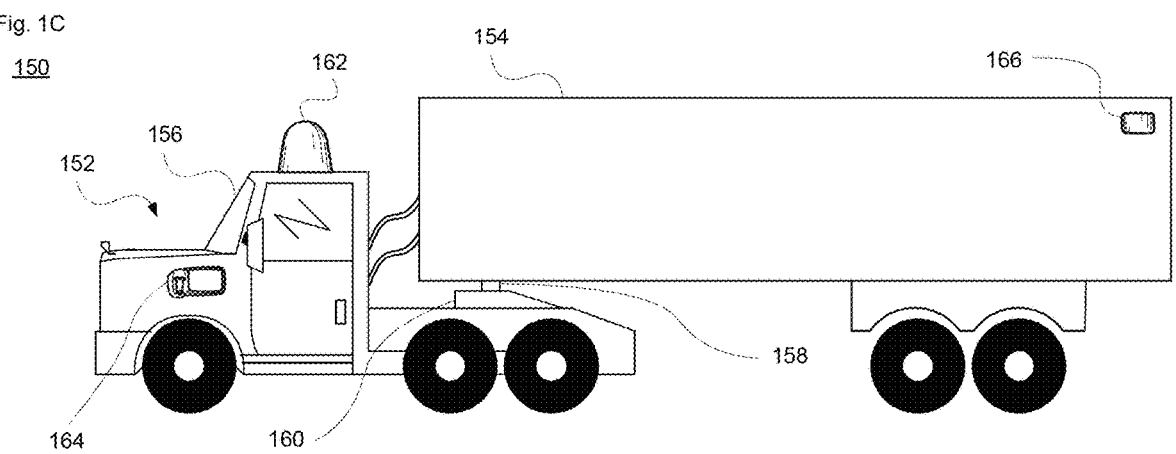
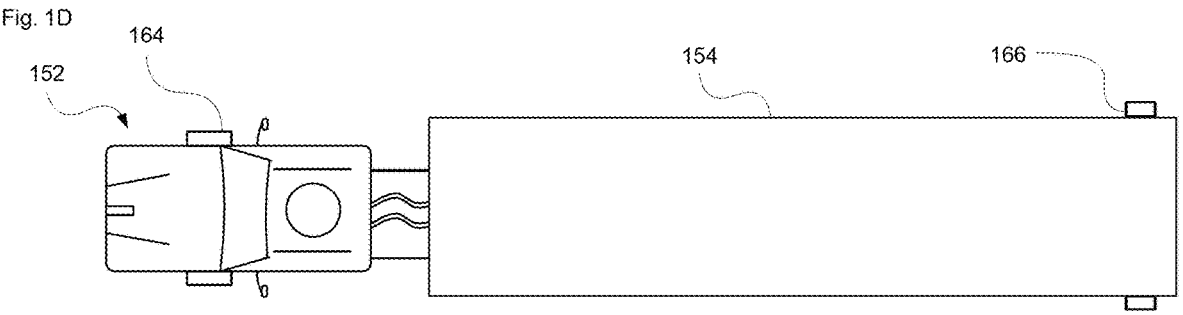

300

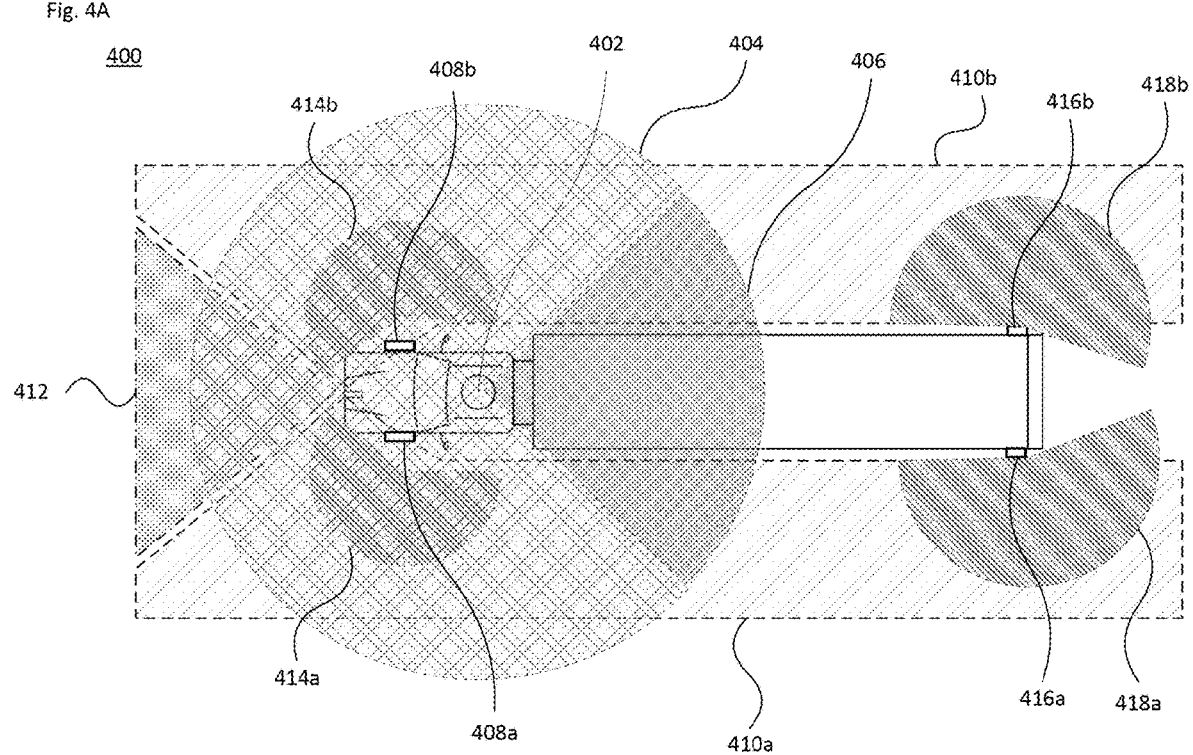

440    442

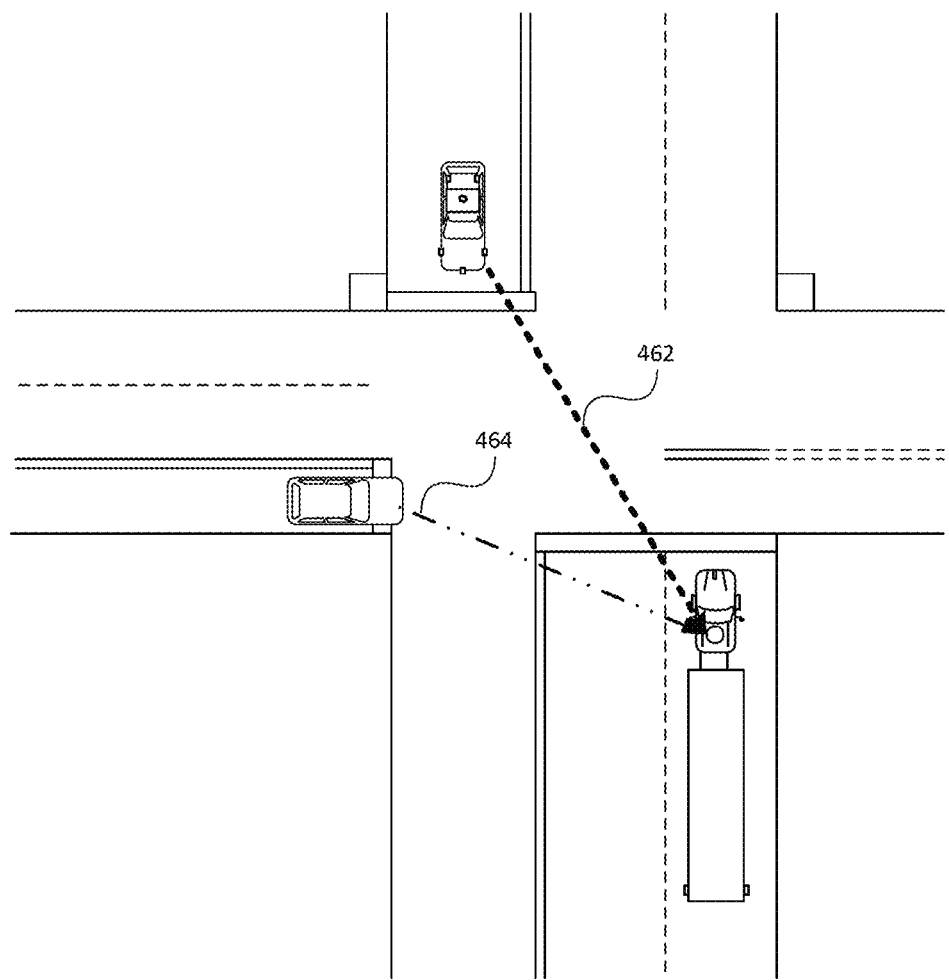

500

520

540

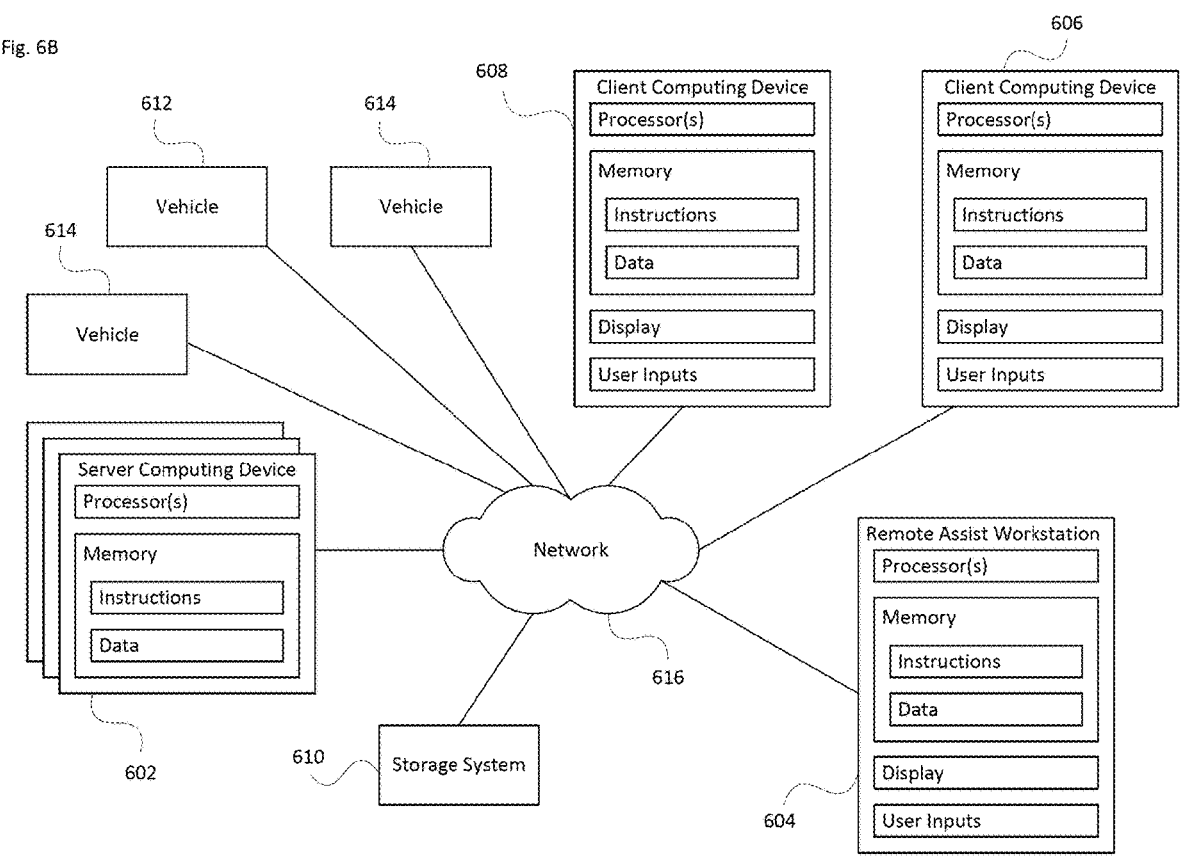

SELF-REFLECTION FILTERING

BACKGROUND

Self-driving vehicles that operate in an autonomous driving mode may transport passengers, cargo or other items from one location to another. During operation, sensors provide real-time information about other objects in the environment. Signals received by sensors located onboard a vehicle may be degraded due to various reasons, including reflections caused by intervening objects. One particularly problematic situation occurs with "self-reflections", where signals from objects in the external environment are reflected off of a portion of the self-driving vehicle. Such reflections can trigger false detections of phantom items or alter the apparent location of a real object, which can adversely impact the ability of the vehicle to operate in a self-driving mode.

BRIEF SUMMARY

The technology relates to handling of self-reflections of sensor signals (e.g., lidar returns) off of a portion of a vehicle that is operating in an autonomous driving mode. In some situations, the perception system for a self-driving vehicle may implement a reflection filter to address reflections of lidar signals caused by objects in the vehicle's external environment. For instance, the system could check whether a lidar point is the second or third return of its beam, where the first return is likely to be a reflective surface (e.g., a high intensity, high planarity reflection). However, this approach may fail when the first return on the reflective surface is missing, e.g., when the surface is like a mirror. In this case, the reflection point becomes the first return. The system could also maintain an image of the lidar field of view (FOV). Each pixel shows how far the lidar can see in that particular direction. Here, the reflection point cloud will be "within" the lidar FOV, but its neighborhood should be mostly beyond the FOV. The challenge in this situation happens for point clouds near the edge of the FOV. Notwithstanding these approaches for externally created reflections, self-reflections caused by the vehicle itself are also problematic because such reflections can cause the vehicle's perception system to detect false objects, make an object appear in one location when it is actually in a different location, or otherwise corrupt the received sensor data.

According to one aspect, a method for handling self-returns for a vehicle operating in an autonomous driving mode is provided. The method comprises determining, by one or more processors of the vehicle, vehicle pose information for the vehicle at a given point in time while operating in the autonomous driving mode; determining, by one or more processors of the vehicle, sensor pose information for one or more sensors of a perception system of the vehicle at the given point in time; receiving, by the one or more sensors, return signals from one or more scans taken of an external environment around the vehicle; evaluating, by the one or more processors of the vehicle based on the vehicle pose information and the sensor pose information, whether a segment between a given one of the one or more sensors and a received point from a selected one of the return signals crosses any surface of a 3D model of the vehicle; upon determining that the received point from the selected return signal crosses any surface of the 3D model of the vehicle, identifying the received point as a self-return point; and in response to identifying the received point as a self-return point, the vehicle performing a selected operation while in the autonomous driving mode.

In one example, the selected operation includes discarding the self-return point from a data set of the received return signals. In another example, the selected operation includes flagging the self-return point as being a self-return and storing the flagged point in memory.

The 3D model of the vehicle may be a static model when the vehicle is not an articulating vehicle. In this case, evaluating whether the segment between a given one of the one or more sensors and the received point from the selected one of the return signals crosses any surface of the 3D model may include evaluating the static model using a lookup table that includes yaw and pitch direction. The 3D model of the vehicle may be a dynamic or kinematic model when the vehicle is an articulating vehicle. In this case, the method may further include using a set of the return signals to estimate trailer orientation of the articulating vehicle.

The one or more sensors may be lidar sensors performing the one or more scans taken of the external environment around the vehicle. Here, the one or more lidar sensors may rotate to provide a field of view of up to 360° around the vehicle.

Performing the selected operation may include identifying a surface or region of the vehicle as a hot spot likely to cause self-reflections. The 3D model of the vehicle may include a buffer around one or more portions of the vehicle. Here, the buffer may depend on a range precision for one or more of the sensors of the perception system of the vehicle.

According to another aspect, a vehicle is configured to operate in an autonomous driving mode. The vehicle comprises a driving system including a steering subsystem, an acceleration subsystem and a deceleration subsystem to control driving of the vehicle in the autonomous driving mode. It also includes a perception system configured to detect objects in an environment external to the vehicle, in which the perception system includes one or more sensors. The vehicle further includes a control system including one or more processors. The control system is operatively coupled to the driving system and the perception system. The control system is configured, while the vehicle is operating in the autonomous driving mode, to: determine vehicle pose information for the vehicle at a given point in time while operating in the autonomous driving mode; determine sensor pose information for the one or more sensors of the perception system of the vehicle at the given point in time; receive, by the one or more sensors, return signals from one or more scans taken of an external environment around the vehicle; evaluate, based on the vehicle pose information and the sensor pose information, whether a segment between a given one of the one or more sensors and a received point from a selected one of the return signals crosses any surface of a 3D model of the vehicle; upon a determination that the received point from the selected return signal crosses any surface of the 3D model of the vehicle, identify the received point as a self-return point; and in response to identifying the received point as a self-return point, cause the driving system of the vehicle to perform a selected operation while in the autonomous driving mode.

The selected operation may include discarding the self-return point from a data set of the return signals. The one or more sensors of the perception system may be lidar sensors configured to take the one or more scans of the external environment around the vehicle. In this case, the one or more lidar sensors may be positioned along a roof section of the vehicle and are configured to rotate to provide a field of view of up to 360° around the vehicle.

The one or more processors may include a processing element of the one or more sensors, in which the processing element is configured to perform the evaluation of whether the segment between a given one of the one or more sensors and the received point from the selected one of the return signals crosses any surface of the 3D model of the vehicle.

In one example, the vehicle is not an articulating vehicle and the 3D model of the vehicle is a static model. In another example, the vehicle is an articulating vehicle and the 3D model of the vehicle is a dynamic or kinematic model. Furthermore, the 3D model of the vehicle may include a buffer around one or more portions of the vehicle.

BRIEF DESCRIPTION OF THE DRAWINGS

FIGS. 1C-D illustrate an example cargo-type vehicle configured for use with aspects of the technology.

FIGS. 4A-D illustrates example sensor fields of view and return signals in accordance with aspects of the disclosure.

FIGS. 6A-B illustrate an example system in accordance with aspects of the technology.

DETAILED DESCRIPTION

Self-reflections can occur with vehicles that have a relatively rigid chassis as well as vehicles that can pivot or articulate. Different sensor types may be employed in an onboard perception system, and those sensors may be positioned or distributed around the vehicle to achieve different fields of view. The present technology addresses the self-reflection problem, which mitigates or otherwise avoids issues such as phantom objects or alternation of the apparent location of an actual object.

Example Vehicle Systems

Figure 1A:
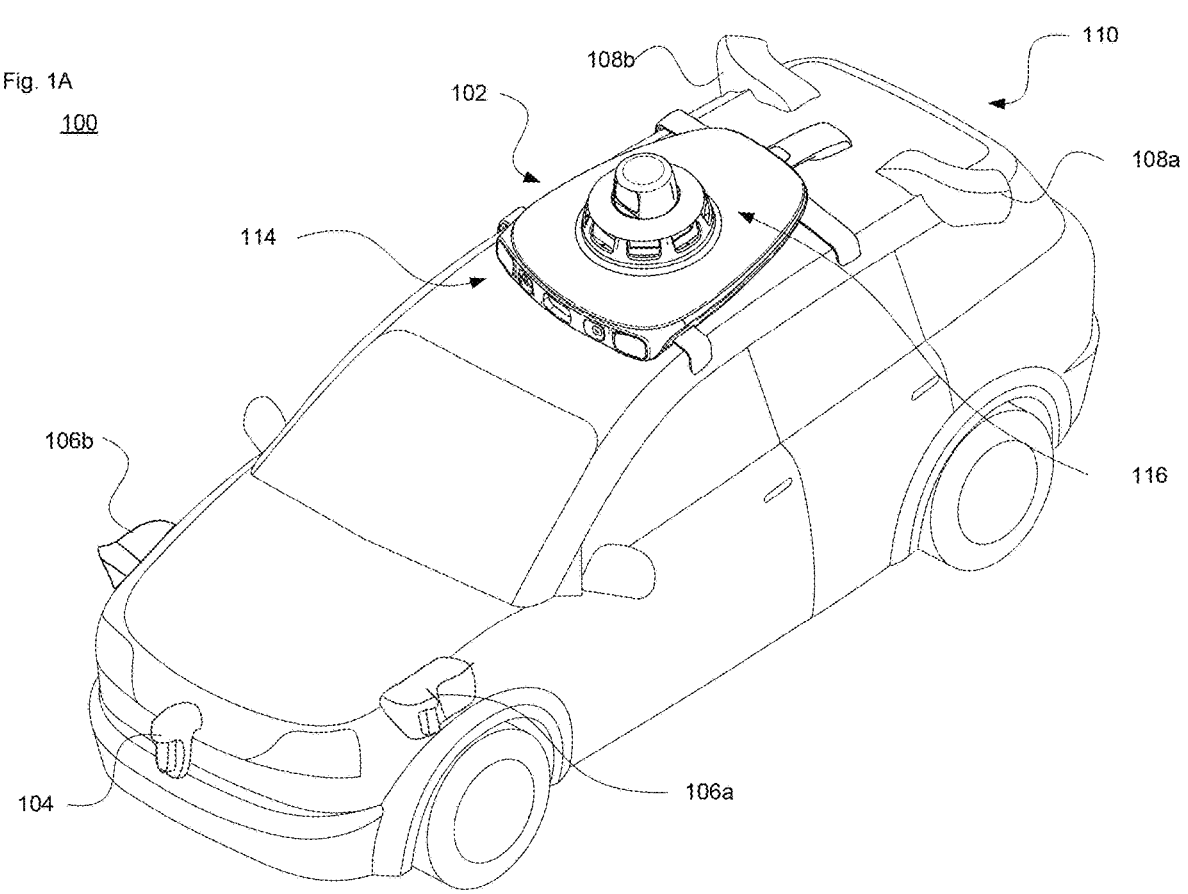
FIGS. 1A-B illustrate example self-driving vehicles in accordance with aspects of the technology.
Figure 1B:
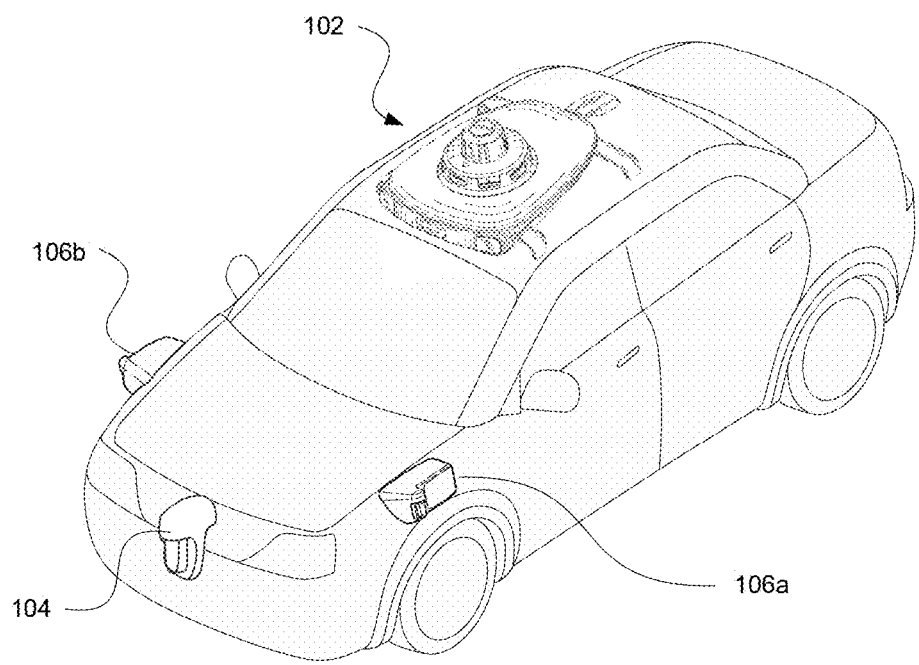

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B (e.g., a sedan). By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

FIGS. 1C-D illustrate an example cargo vehicle 150, such as a tractor-trailer truck. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

Figure 1E:
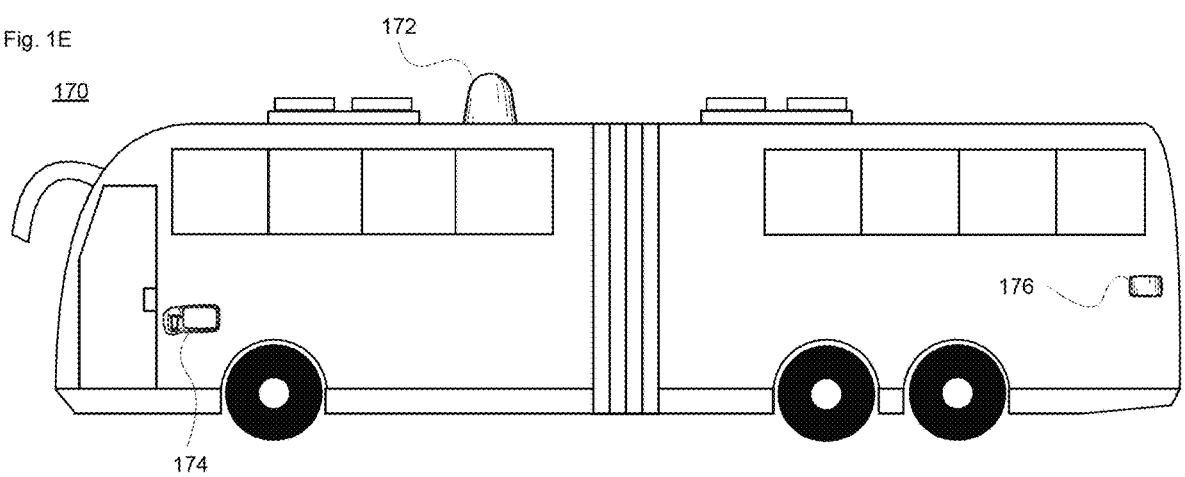
FIGS. 1E-F illustrate an example articulated bus arrangement for use with aspects of the technology.
Figure 1F:
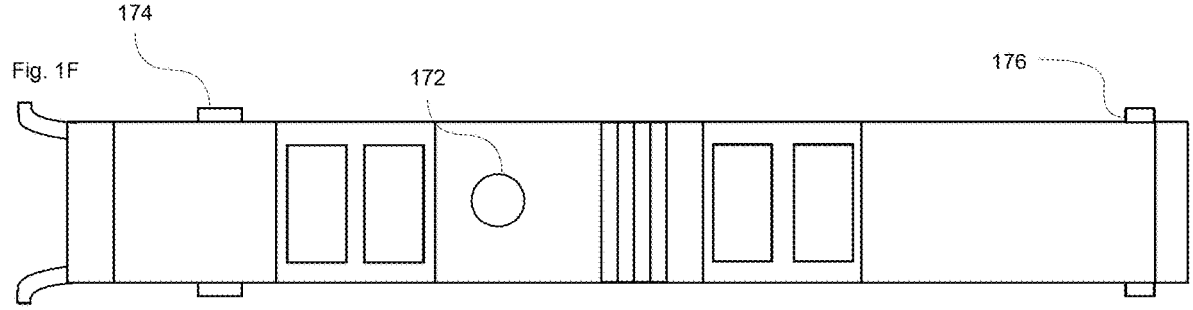

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154. FIGS. 1E-F illustrate an example of another type of articulated vehicle 170, such as an articulated bus. As with the tractor-trailer 150, the articulated bus 170 may include one or more sensor units 172, 174 and/or 176 disposed along different areas of the vehicle.

As with the sensor units of the passenger vehicle of FIGS. 1A-B, each sensor unit of the cargo vehicle or the articulating vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions or situations. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
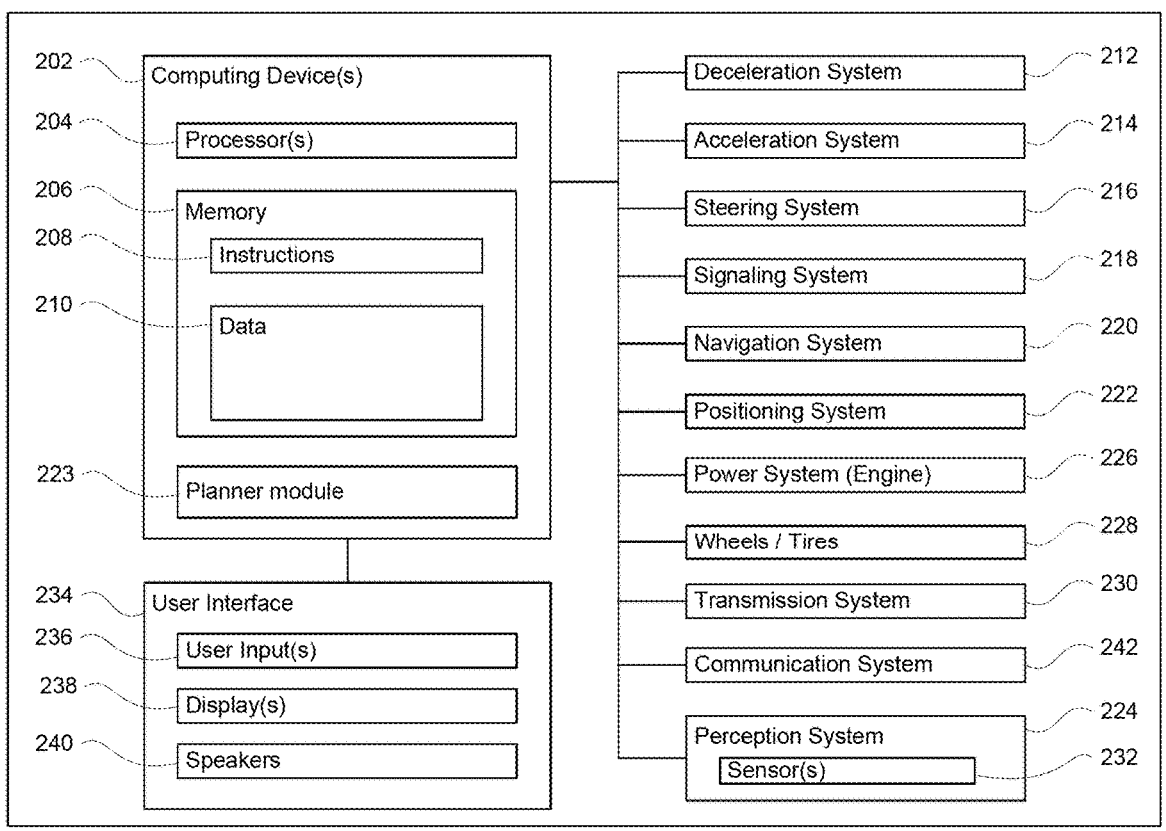
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include one or more models to perform self-reflection filtering, including one or more models of the vehicle. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs or GPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously in either a partial or fully autonomous driving mode.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway. By way of example only, the perception system 224 may include lidar sensors, radar units, cameras (e.g., optical imaging devices, with or without a neutral-density filter (ND) filter), one or more microphones or other acoustical arrays, positioning sensors (e.g., gyroscopes, accelerometers and/or other inertial components), infrared sensors, and/or any other detection devices that record data which may be processed by computing devices 202.

Such sensors of the perception system 224 may detect objects in the environment outside of the vehicle and their characteristics such as location, orientation relative to the roadway or relative to the vehicle, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 (such as via a processing chip of the sensor or incorporated into a sensor assembly module) and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform validation or calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In some examples, these may be integrated into front, rear or side perimeter sensor assemblies around the vehicle (e.g., units 104 and 106). In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. Other output devices, such as speaker(s) 240 may also be located within the passenger vehicle.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
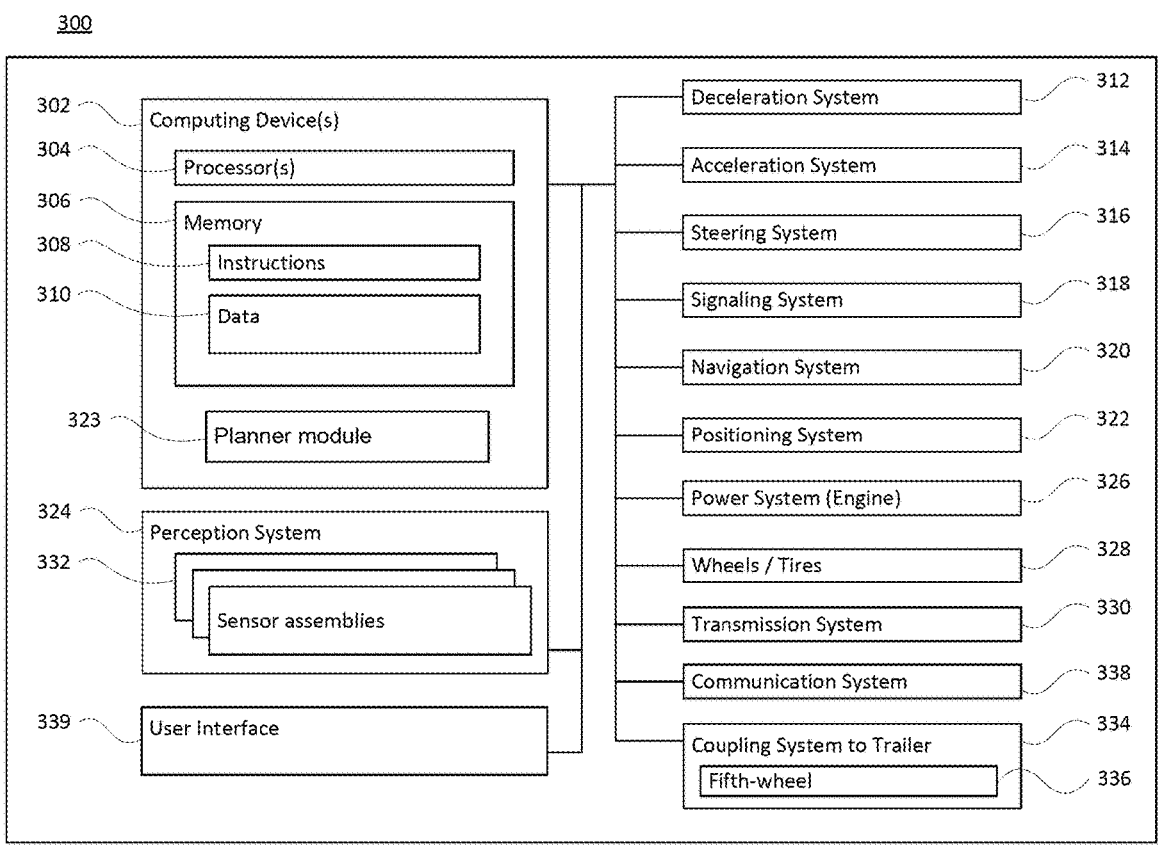
FIGS. 3A-B are block diagrams of systems of an example cargo-type vehicle in accordance with aspects of the technology.

FIG. 3A illustrates a block diagram 300 with various components and systems of a vehicle, e.g., vehicle 150 of FIGS. 1C-D or vehicle 170 of FIGS. 1E-F. By way of example, the vehicle may be a truck, bus, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the memory may include one or more models to perform self-reflection filtering.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150 or vehicle 170. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels and deceleration system 312. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154, or along the front and rear portions of the articulating vehicle 170. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck, bus or other vehicle may also include a user interface subsystem 339. The user interface subsystem 339 may be located within the cabin of the vehicle and may be used by computing devices 202 to provide information to passengers within the vehicle, such as a truck driver who is capable of driving the truck in a manual driving mode.

Figure 3B:
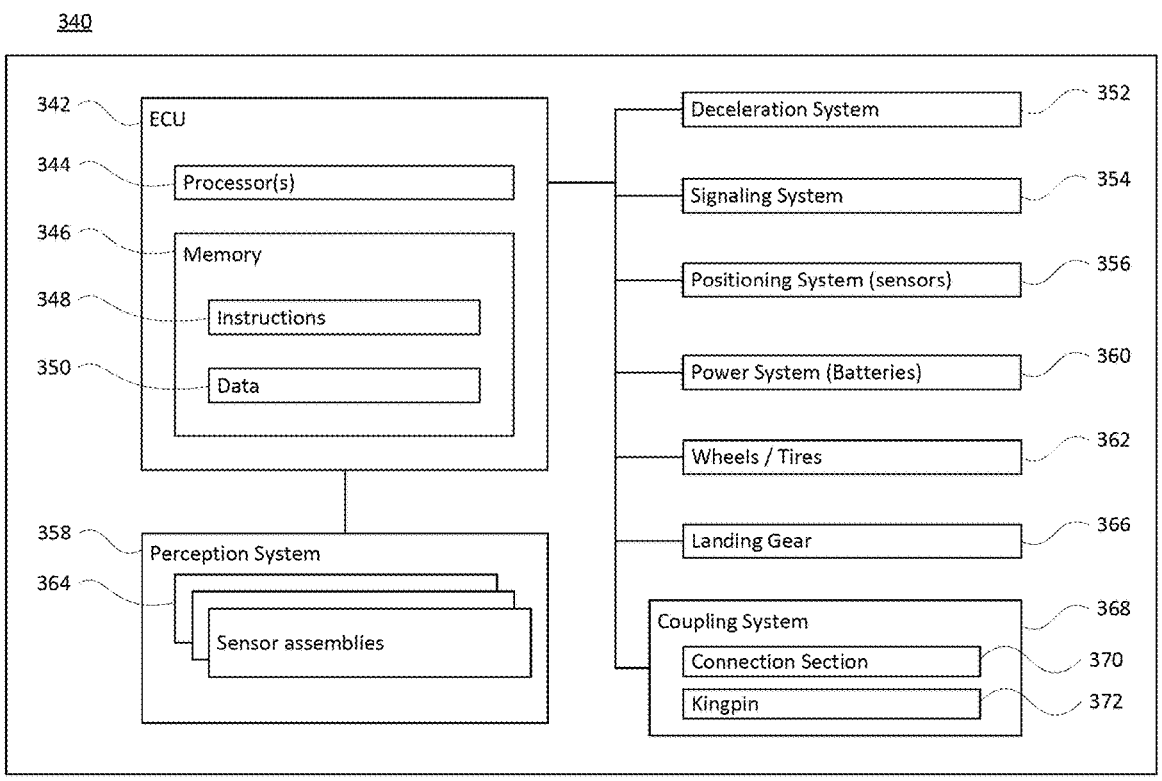

FIG. 3B illustrates an example block diagram 340 of systems of a trailer unit, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, wheel speed and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

Example Implementations

In view of the structures and configurations described above and illustrated in the figures, various aspects will now be described in accordance with aspects of the technology.

As noted above, various sensors may be located at different places around the vehicle to gather data from different parts of the external environment and/or the vehicle itself. Certain sensors may have different fields of view (FOV) of the external environment and/or parts of the vehicle depending on their placement around the vehicle and the type of information they are designed to gather. For instance, different lidar sensors may be used for near (short range) detection of objects adjacent to the vehicle (e.g., with a range of less than 2-10 meters), while others may be used for far (long range) detection of objects a hundred meters (or more or less) in front of the vehicle. Mid-range lidars may also be employed (e.g., a range between 5-150 meters). Multiple radar units may be positioned toward the front or rear of the vehicle for long-range object detection as well as on the sides of the vehicle for perimeter detection of adjacent objects. And cameras may also be arranged in various locations to provide good visibility around the vehicle, including for close-in sensing adjacent to the vehicle.

Depending on the configuration, a set of sensors may be arranged within one housing or distributed in an arrangement around the vehicle to include multiple individual sensors with overlapping fields of view. Alternatively or additionally, other sensors may provide redundant 360° fields of view. In addition to detecting objects in the environment external to the vehicle, these sensors may be used to determine the vehicle's actual pose including, e.g., the orientation of the trailer with respect to the tractor unit of a cargo vehicle, or the respective orientations of the front and rear of an articulated bus. This can include orientation information about the state of different sections of the vehicle (e.g., tractor or trailer, front or rear of bus, etc.) in terms of position, roll, pitch, yaw, and associated time derivatives of such state information.

FIG. 4A provides one example 400 of sensor fields of view relating to the sensors, such as those illustrated in FIGS. 1C-D. As illustrated in this example, the lidar(s) in roof pod assembly 402 may have a FOV 404, such as a 360° FOV. Here, as shown by darker region 406, the trailer or other articulating portion of the vehicle may provide signal returns including self-returns, and may partially or fully block a rearward view of the external environment. Long range lidars of left and right side sensor units 408a, 408b of the tractor unit have corresponding FOVs 410a and 410b. These can encompass significant areas adjacent to and along the sides and front of the vehicle. As shown, there may be an overlap region 412 of the fields of view of these various sensors in front of the vehicle. The overlap region 412 may provide the perception system with additional or information about a very important region that is directly in front of the tractor unit. This redundancy also has a safety aspect. Should one of the long range lidar sensors suffer degradation in performance, the redundancy would still allow for operation in an autonomous mode. Short range lidars of the sensor units 408a and 408b have smaller FOVs 414a and 414b, for instance as part of a close-in sensing system to detect objects immediately adjacent to the front portion (e.g., tractor) of the vehicle. Both the long range and short range lidars may be co-located in a single housing 408a or 408b as shown, or may be disposed separately on the vehicle. In addition, left and right side sensor units 416a and 416b may be located along the rear of the vehicle, such as the trailer. Here, these sensor units have corresponding FOVs 418a and 418b, for instance as part of the close-in sensing system to detect objects immediately adjacent to the rear portion (e.g., trailer) of the vehicle. Spacing is shown between different fields of view for clarity in the drawing; however, in actuality there may be no break in the coverage. The specific placements of the sensor assemblies and fields of view is merely exemplary, and may be different depending on, e.g., the type of vehicle, the size of the vehicle, FOV requirements, etc.

Figure 4B:
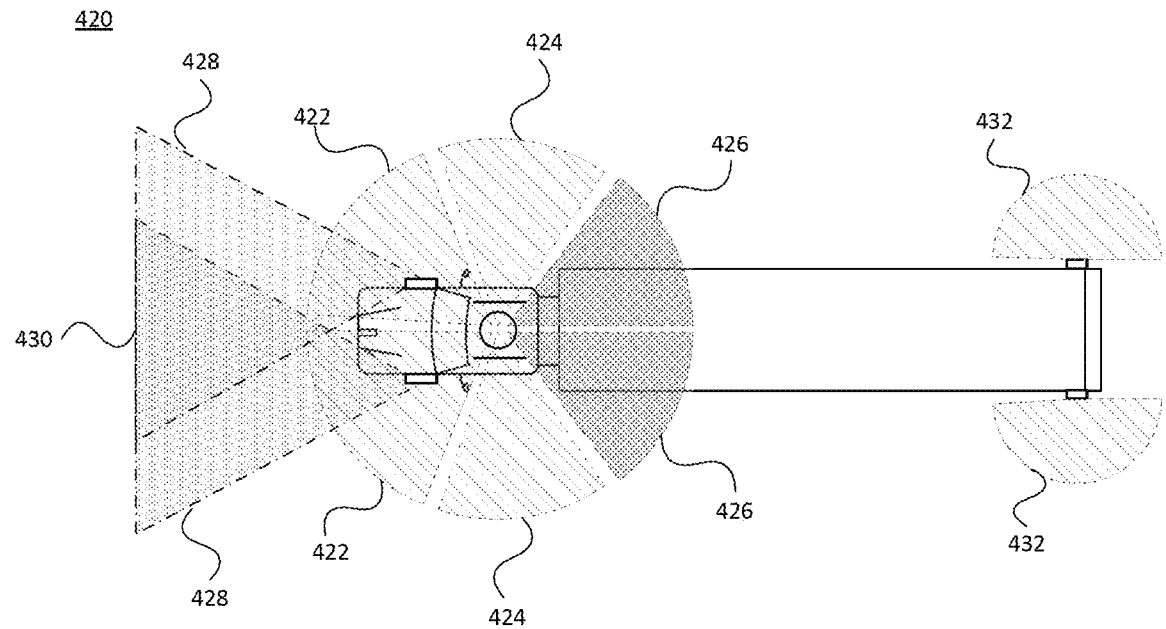

FIG. 4B illustrates an example configuration 420 for either (or both) of radar and camera sensors in a rooftop housing and on both sides of a tractor-trailer vehicle. Here, there may be multiple radar and/or camera sensors in each of the sensor housings 402, 408 and/or 416. As shown, there may be sensors in the rooftop housing with front fields of view 422, side fields of view 424 and rear fields of view 426. As with region 406, the trailer may impact the ability of the sensors with FOVs 426 to detect objects behind the vehicle, e.g., due to self-reflection of certain signals. Sensors in the side sensor assemblies 408 may have forward facing fields of view 428 (and side and/or rear fields of view as well). And sensors in the rear perimeter assemblies 416 may have side and rearward facing FOVs 432. As with the lidars discussed above with respect to FIG. 4A, the sensors of FIG. 4B may be arranged so that the adjoining fields of view overlap, such as shown by overlapping region 430. The overlap regions here similarly can provide redundancy and enhanced resolution, and have the same benefits should one sensor suffer degradation in performance.

These sensors are employed to gather information about the external environment around the vehicle, including other objects, road conditions, weather conditions, etc. Sensor information can also be used to obtain pose and other information about the vehicle itself, such as an accurate trailer position relative to the tractor. The on-board control system is able to use the received sensor information and the vehicle's kinematic model in conjunction with geographic data (e.g., maps) to plan routes or select trajectories that are optimized for vehicle maneuvering.

Figure 4C:
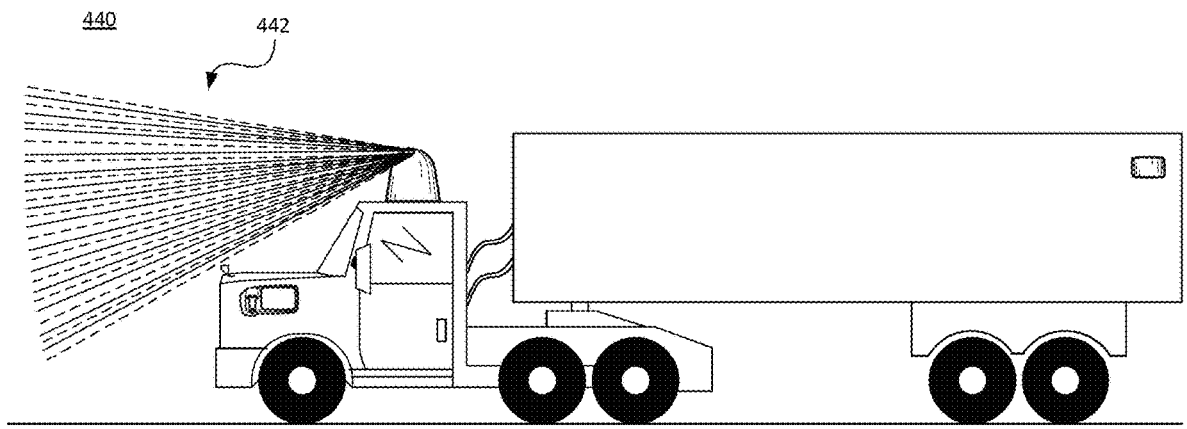

These and other sensors can detect not only the location of objects in the environment, but also their height and other information as well. This may be done by making multiple scans of the environment by one or more sensors. By way of example, illustration 440 of FIG. 4C shows a vehicle using a sensor assembly to scan for objects in the environment. The sensor assembly may be, e.g., rooftop sensor assembly, a front, side or rear perimeter sensor assembly, etc. The sensor assembly may include one or more lidar, radar, camera or other sensors therein. In the scenario of FIG. 4C, solid and dashed lines 442 emanating from the housing indicate examples of individual scans of the environment. For instance, 10 (or more or less) individual scans may be made by a given sensor per scan period. This may include adjusting the sensor's FOV up or down, left or right, e.g., with a motor, servo or other actuator. The individual scans may be selected to cover particular portions of the sensor's FOV or selected regions around the vehicle. Illustration 460 of FIG. 4D shows that some of the scans (e.g., via the dotted line 462 and dash-dot line 464) may generate one or more return signals from objects in the vehicle's environment.

Raw return signals from lidar scans form a point cloud of information about the external environment. Based on this information, the on-board control system (e.g., computing devices 202 or 302) may detect objects of different size, shape and height, such as passenger vehicles, bicycles, streetlights and street signs, foliage, curbs, etc. The information about the locations and different heights of such objects can be used in accordance with a vehicle model to plan how to orient the wheel sets in order to select a particular driving operation or other maneuver. However, point cloud information that is not returned directly from an object, in particular due to a self-reflection from a portion of the vehicle, can provide a false representation about the external environment.

Figure 5A:
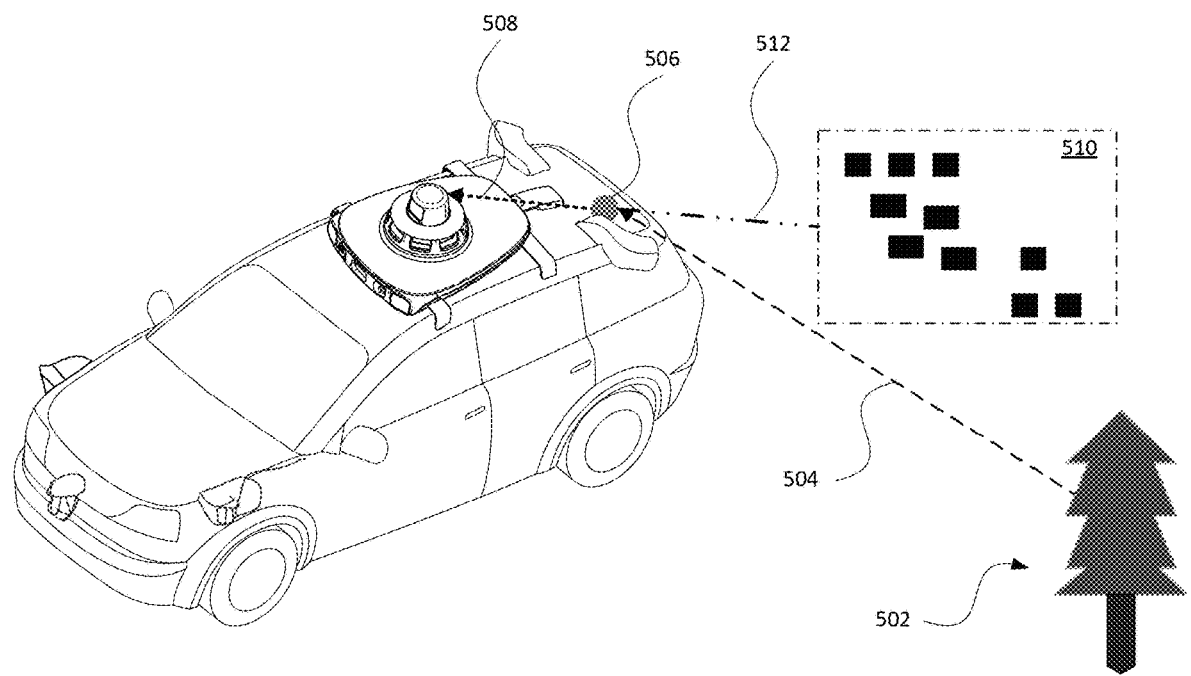
FIGS. 5A-C illustrate self-reflection scenarios in accordance with aspects of the disclosure.
Figure 5B:
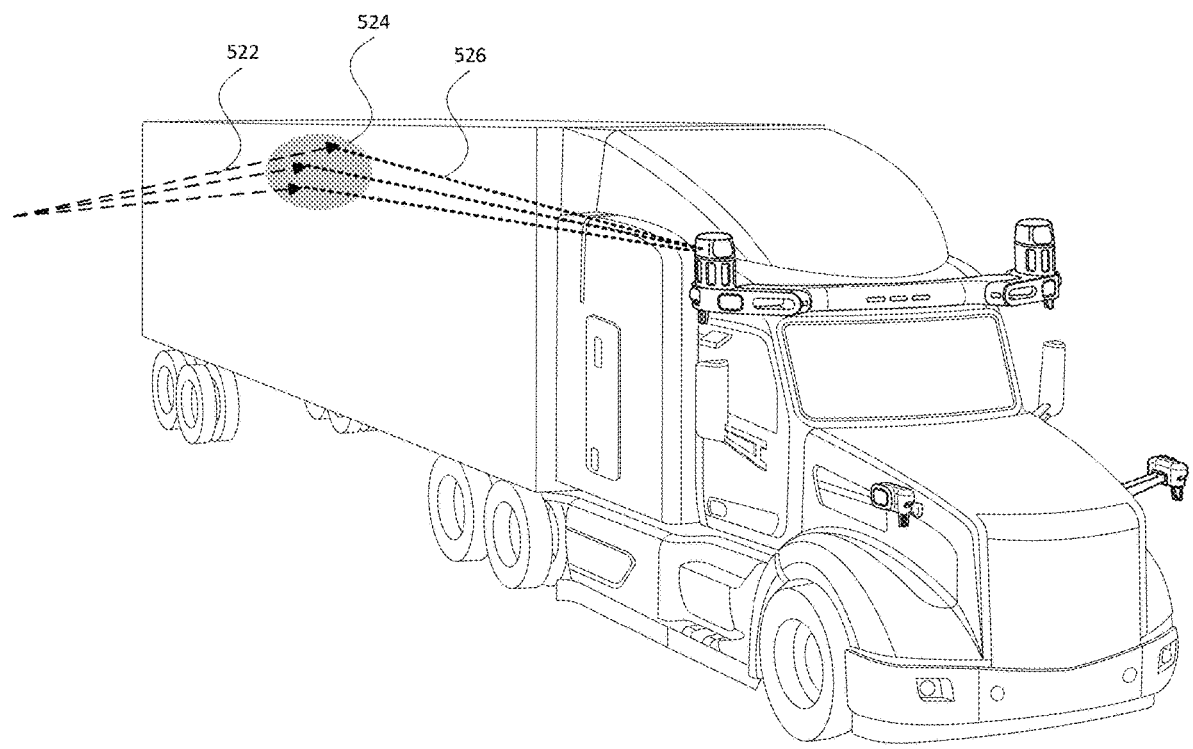
Figure 5C:
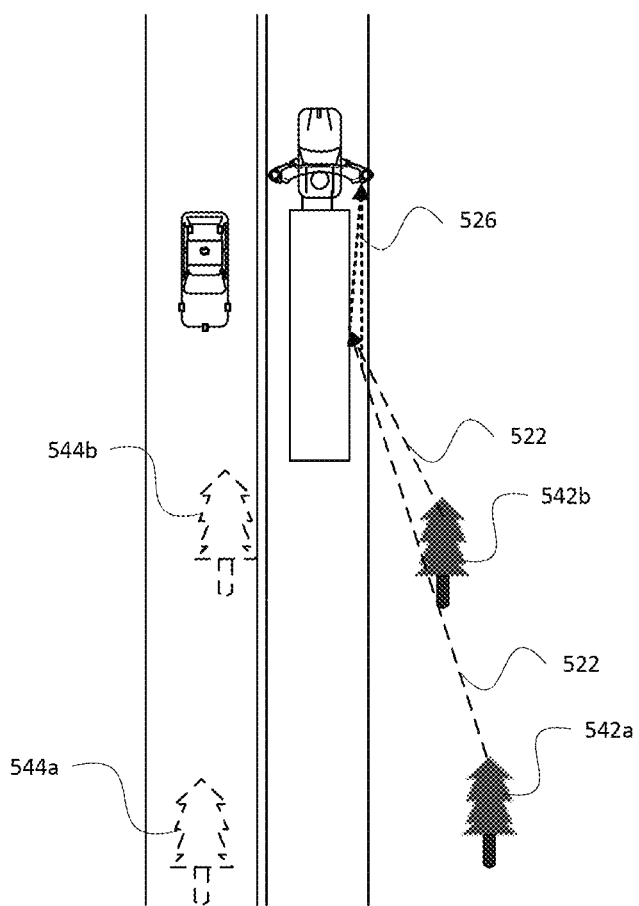

For instance, view 500 of FIG. 5A illustrates a self-reflection example from a rigid chassis type vehicle, and views 520 and 540 of FIGS. 5B-C illustrate a self-reflection example from a vehicle that is able to pivot or articulate. In particular, as shown in FIG. 5A, a tree 502 or other object may cause a return from one or more scans of a lidar sensor of the vehicle. Initial path 504 of the return (shown by a dashed line) is reflected by region 506 on a surface of the vehicle, which redirects the return along an adjusted path 508 (shown by a dotted line). The return from the adjusted path 508 is then received by the lidar sensor. In this example, the self-reflection of one or more such returns may cause the perception system or other processing system of the vehicle to falsely detect one or more trenches or artifacts 510 along the roadway, as shown within the dash-dot bounding box. This is because the adjusted path 508 may be incorrectly perceived to be coming from one or more objects along dash-dot path 512.

In the example of FIGS. 5B-C, returns along initial path 522 (shown by dashed lines) are reflected by a region 524 on a surface of the vehicle, such as a side panel of the trailer. Here, as shown in FIG. 5B, the region 524 redirects the returns along adjusted paths 526, which are when received by a lidar sensor mounted, e.g., along an upper cap portion of the vehicle. As shown in FIG. 5C, the initial paths 522 are cause by objects 542a and 542b, which may be trees or other objects. In this case, the adjusted paths may provide false representations 544a and 544b of the objects in apparent locations that are significantly different from the actual locations. Thus, vehicles that can pivot or articulate can also experience the same type of self-reflections as rigid body vehicles. Reflections both from the trailer as well as the tractor/cabin (in a tractor/trailer example) may both cause self-reflections.

According to one aspect of the technology, a general approach for addressing self-reflections is as follows. First, a 3D model of the autonomous vehicle is constructed. For articulating vehicles, this includes also building a 3D model for the trailer or other articulating section, such as a dynamic or kinematic model. A kinematic model is a geometric model, and can be used to predict or describe vehicle motion in a speed-invariant way. However, a dynamic model may be employed, for instance to consider factors that depend on speed (e.g., drag and slip). The vehicle model can be calibrated to account for real-world conditions and driving situations. For instance, it may factor in road shape (e.g., straight or curved), incline or decline angle, surface type (e.g., asphalt, concrete or gravel), potholes, etc. The positional relationship of the tractor unit and the trailer to one another is part of the model. For enhanced accuracy, the vehicle model may be calibrated on a per-vehicle or a per-trailer basis. The vehicle model may be employed by a planning subsystem, such as planner module 223 of FIG. 2 or 323 of FIG. 3A, when selecting a driving route and otherwise controlling the vehicle in an autonomous driving mode.

Different approaches can be used for creating model, including a bounding box or 3D mesh. In one scenario, a k-d tree could be used to query if a portion of the vehicle is within the 3D shape. For instance, the k-d tree may be used to tell whether the ray from the lidar center to any point intersects with the 3D model of the vehicle (including the trailer or other articulating element if applicable). The 3D model is typically represented by triangle mesh.

In addition to having a bounding box, mesh or other 3D model of the vehicle, the specific position of each lidar unit and/or other sensor mounted on the vehicle is known. As indicated in the examples shown in FIGS. 1A-F, the sensors could be roof mounted, disposed along the front, rear, sides, etc., of the vehicle, including the cab of a truck and/or along the trailer. Having both the vehicle model and positioning of the lidar unit(s), the system can operate in real time as follows. While driving in an autonomous driving mode, the vehicle pose (e.g., orientation along the roadway or pitch, yaw and roll (and associated time derivatives of such state information) of the vehicle chassis or articulating elements relative to a coordinate system) is computed.

The pose of an articulating vehicle may involve estimation of the orientation of the trailer relative to the tractor. Here, different techniques can be employed, including using the lidar and/or other onboard sensors to detect the relative positioning of the vehicle elements. By way of example, it may be sufficient to determine which "face" of the trailer or articulating component (e.g., front, right or left face) is seen by a lidar sensor on the cab of the truck or other vehicle. Turning angle information may be used to identify whether a lidar sensor is seeing the right or left side face of the trailer or other articulating component. Alternatively, physical measurements from the kingpin/fifth wheel connection (or other pivot point) may provide information about the orientation of the trailer relative to the tractor.

The pose of each sensor (e.g., lidar unit) is also computed at the same points in time. The sensor pose, such as the position and orientation of a given sensor relative to a fixed point or other part of the vehicle, may change depending on operation of the sensor, where it is mounted along the vehicle, whether the vehicle is an articulated vehicle, or other factors. For instance, the sensor pose evaluation may involve computing the segment between the ray source and the lidar unit location, and then checking whether the segment intersects with the 3D model. For a "single source" lidar sensor, the physical location of the center of the lidar unit is sufficient. In one example, it may be assumed that every lidar sensor has only one source.

Using a lidar sensor as an example, while the vehicle is operating in autonomous driving mode, as noted above the raw return signals from each spin's scan form a point cloud (a cluster of data points). Based on the placement of the sensor along the vehicle, the sensor FOV, and, for articulating vehicles the relative pose of the different vehicle sections, it can be expected for a subset of the return signals to be self-returns from the vehicle. Using the pose information, the self-reflection filtering process involves checking, for any raw lidar point in a lidar spin, whether the segment between the lidar device and the lidar point crosses any surface of the 3D model of the vehicle. If so, this is determined to be a reflection point caused by a surface the vehicle. In one example, the system may identify whether certain parts, surfaces or regions of the vehicle are "hot spots" that tend to (or are otherwise likely to) cause self-reflections. For instance, if a particular area like the side-view mirror is the cause for self-reflections multiple times during a trip or in different driving scenarios, that information can be used in the self-reflection filtering process. Furthermore, for such hot spots, the system can employ a larger tolerance than other surfaces or regions of the vehicles. For example, even if a segment does not cross some highly reflective part, as long as it is still within a buffer distance to the part, the system may consider that lidar point as a self-reflection. And besides shape information of the vehicle surface, the vehicle model it could also contain material information to adjust the filtering threshold in view of possible hot spots.

According to one aspect of the technology, it may be beneficial to perform this evaluation as "up front" in the system as possible. For instance, the lidar sensor unit itself or the sensor assembly may include a controller, processing chip (e.g., a chip with a CPU or ASIC) or other processing element that performs this evaluation. Here, the processing may include converting the vehicle 3D model to a format which is interpretable by the sensor unit or sensor assembly (e.g., into a perspective view) and store the converted model locally in memory (e.g., SRAM). This localized processing could check each lidar or other data point before submitting processed results to the main system (e.g., computing device 202 or 302). In this scenario, the full lidar pose (e.g., a 6-degree of freedom pose) would not be necessary, because only the relative yaw between vehicle body and the sensor unit is needed and that information is known from, e.g., a spinning encoder or other inertial or positioning device associated with the lidar sensor. In the case of an articulating vehicle, the full pose of the trailer or other articulating element, as well as the shape of the elements, would be needed.

The analysis for a fixed-body vehicle could employ a lookup table that includes yaw and pitch direction. In one example, there may be some buffer room around the model for one or more portions of the vehicle, for instance due to inferring relative poses for different part of an articulating vehicle. For instance, the buffer room may depend on the range precision of the lidar or other sensor. Here, a specific threshold of, e.g. 0.05 m-0.2 m (or more or less) could be used. Or, alternatively, the system could tolerate a larger buffer for larger ranges. Thus, in this case, the buffer may be dynamic and scale with the range. According to one example, the tolerance (buffer) may be a linear function of the range (e.g., delta*range). In other examples, the tolerance may scale nonlinearly.

According to one aspect, the received point cloud information from each lidar is analyzed individually for that sensor. However, the system may use information from different sensors to determine information such as the pose of an articulating vehicle. For example, trailer orientation may be estimated using two side mounted lidars (see the vehicle in FIG. 5B) instead of a single center mounted lidar (see the vehicles of FIGS. 1C-F).

As noted with the example of FIG. 5A, reflection points could trigger a false trench detection. And as noted with the example FIGS. 5B-C, reflected objects could falsely appear as being on an opposing portion of the roadway. Detailed map information may be used in some instances to identify and exclude certain self-reflection issues, such as the trees of FIG. 5C appearing in the middle of the roadway. This could be beneficial for static-type objects like trees and rocks. However, it may be difficult to identify the type of object during real-time driving in an autonomous mode, so flagging such errors could be challenging. Also, a trench or other roadway issue (such as in the example of FIG. 5A) could appear as a result of ongoing construction, which makes reliance on a prior map problematic. While detection of actual road issues not found in a map can be broadcasted to other vehicles or sent to a back-end system for appropriate dissemination to other road users, the onboard perception system still needs to prepare for new issues that may be unexpected. The system could also use information about the apparent object type (e.g., a tree or other static object) as part of the self-reflection analysis when determining whether to discard or ignore the sensor data. For instance, if the object type is determined to be a tree, and that tree appears on the map, then the analysis could factor in such details to determine whether a self-reflection has occurred and that the sensor information should not be used when making driving operation decisions.

Once the process identifies specific points as being self-reflections, those points may be discarded. Alternatively, such points may be maintained in a data set but flagged as self-reflections. Here, for instance, the onboard computing system of the vehicle or a remote back end system may further analyze the self-returns. This may be done, by way of example only, to train object recognition models or for virtual driving scenarios to evaluate how the planner module may react to such artifacts. Regardless of whether the self-reflections are discarded from the data set or flagged as errors, the resultant set of data points in the point cloud can then be used by the onboard processing system for routine object detection and recognition. Thus, the self-reflection information would not be used for object detection and recognition, thereby reducing the likelihood of false object detection or false locations for objects.

According to another example, analysis of the self-return information could be used to refine the 3D vehicle model, either in real time or as part of an offline post-processing analysis. For instance, during autonomous driving most of the time the self-driving vehicle is not close to other objects, so it is straightforward to get "clean" self-return point clouds. Then the system can use those points to update the vehicle model slowly online. Also, for a rigid body vehicle, such information can also be used to do online lidar calibration and validation by comparing a stored self-return model and the online model.

As noted above, the technology is applicable for various types of vehicles, including passenger cars, buses, motorcycles, emergency vehicles, RVs, construction vehicles, and large trucks or other cargo carrying vehicles. In addition to using the self-return information for operation of an individual self-driving vehicle, this information may also be shared with other self-driving vehicles, such as vehicles that are part of a fleet, as well as with a back-end system for further evaluation.

Figure 6A:
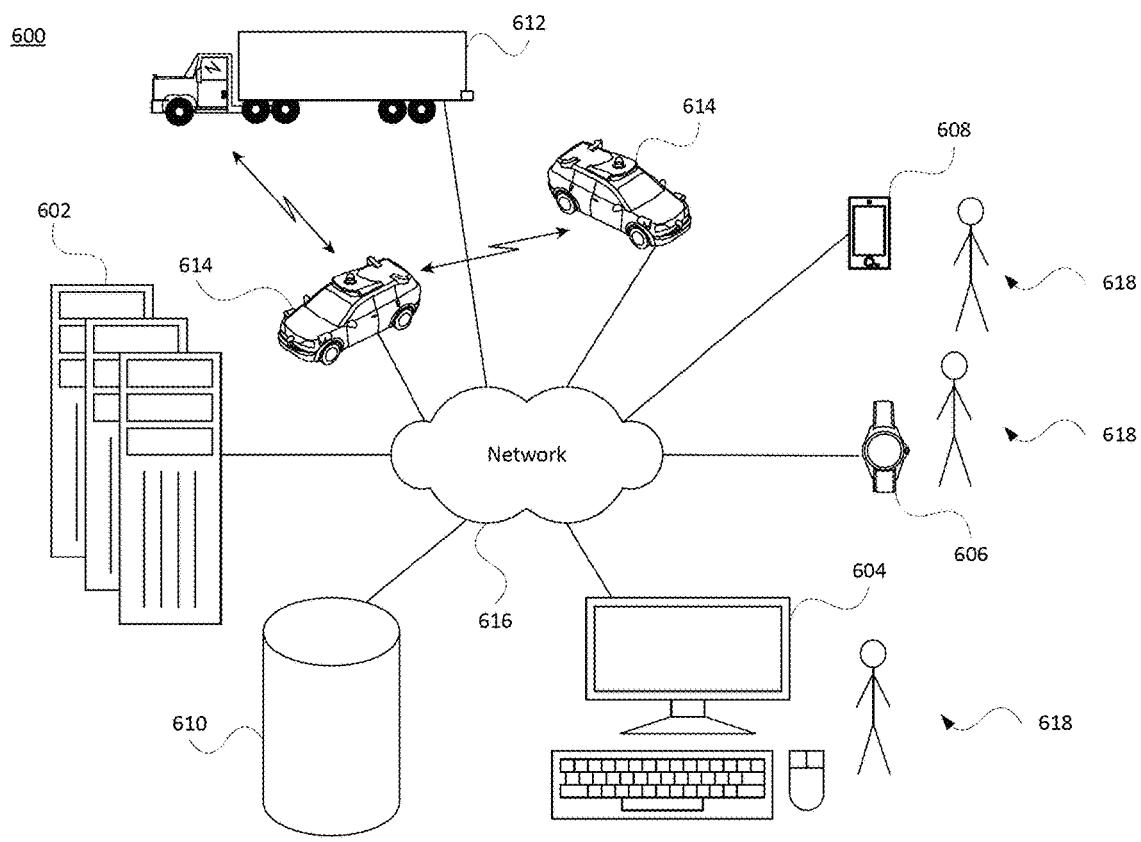

One example of such an arrangement is shown in FIGS. 6A and 6B. In particular, FIGS. 6A and 6B are pictorial and functional diagrams, respectively, of an example system 600 that includes a plurality of computing devices 602, 604, 606, 608 and a storage system 610 connected via a network 616. System 600 may also include vehicles 612 and/or 614 configured to operate in an autonomous driving mode, which may be configured the same as or similarly to vehicles 100, 150 and/or 170 of FIGS. 1A-B and 1C-D, respectively. Vehicles 612 and/or vehicles 614 may be part of a fleet of vehicles. Although only a few vehicles and computing devices are depicted for simplicity, a typical system may include significantly more.

As shown in FIG. 6B, each of computing devices 602, 604, 606 and 608 may include one or more processors, memory, data and instructions. Such processors, memories, data and instructions may be configured similarly to the ones described above with regard to FIG. 2 or 3A.

The various computing devices and vehicles may communication directly or indirectly via one or more networks, such as network 616. The network 616, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 602 may include one or more server computing devices having a plurality of computing devices, e.g., a load balanced server farm, that exchange information with different nodes of a network for the purpose of receiving, processing and transmitting the data to and from other computing devices. For instance, computing device 602 may include one or more server computing devices that are capable of communicating with the computing devices of vehicles 612 and/or 614, as well as computing devices 604, 606 and 608 via the network 616. For example, vehicles 612 and/or 614 may be a part of a fleet of self-driving vehicles that can be dispatched by a server computing device to various locations. In this regard, the computing device 602 may function as a dispatching server computing system which can be used to dispatch vehicles to different locations in order to pick up and drop off passengers or to pick up and deliver cargo. In addition, server computing device 602 may use network 616 to transmit and present information to a user of one of the other computing devices or a passenger of a vehicle. In this regard, computing devices 604, 606 and 608 may be considered client computing devices.

As shown in FIG. 6A each client computing device 604, 606 and 608 may be a personal computing device intended for use by a respective user 618, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 606 and 608 may be mobile phones or devices such as a wireless-enabled PDA, a tablet PC, a wearable computing device (e.g., a smartwatch), or a netbook that is capable of obtaining information via the Internet or other networks.

In some examples, client computing device 604 may be a remote assistance workstation used by an administrator or operator to communicate with drivers of dispatched vehicles. Although only a single remote assistance workstation 604 is shown in FIGS. 6A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to perform a post-processing analysis of the self-return data, for instance to identify particular regions along the vehicle(s) that may be likely to produce self-returns (or self-reflections).

Storage system 610 can be of any type of computerized storage capable of storing information accessible by the server computing devices 602, such as a hard-drive, memory card, ROM, RAM, DVD, CD-ROM, flash drive and/or tape drive. In addition, storage system 610 may include a distributed storage system where data is stored on a plurality of different storage devices which may be physically located at the same or different geographic locations. Storage system 610 may be connected to the computing devices via the network 616 as shown in FIGS. 6A-B, and/or may be directly connected to or incorporated into any of the computing devices.

Storage system 610 may store various types of information. For instance, the storage system 610 may also store autonomous vehicle control software which is to be used by vehicles, such as vehicles 612 or 614, to operate such vehicles in an autonomous driving mode. Storage system 610 may also store vehicle models. The model information may be updated and shared with specific vehicles or the entire fleet as needed. It may be updated in real time, periodically, or off-line as additional self-reflection information or other data is obtained. The storage system 610 can also include map information, route information, weather information, etc. This information may be shared with the vehicles 612 and 614, for instance to help with self-return analysis by the on-board computer system(s), such as during real-time driving by a particular vehicle when objects are detected in the vehicle's external environment.

Figure 7:
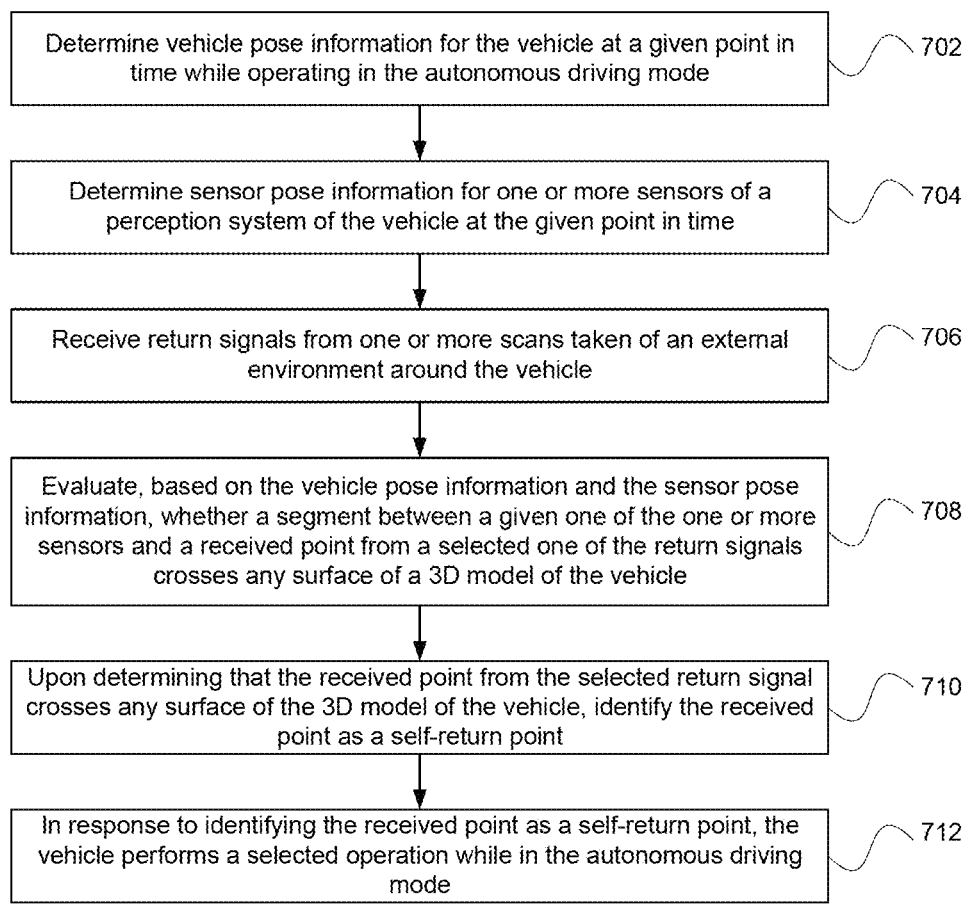
FIG. 7 illustrates a method in accordance with aspects of the technology.

FIG. 7 illustrates an example method of operation 700 in accordance with the above discussions for operating a vehicle in an autonomous driving mode. As show in block 702, the method includes determining, by one or more processors of the vehicle, vehicle pose information for the vehicle at a given point in time while operating in the autonomous driving mode. At block 704, the processors determine sensor pose information for one or more sensors of a perception system of the vehicle at the given point in time. At block 706, the one or more sensors receive return signals from one or more scans taken of an external environment around the vehicle. At block 708, the processor(s) evaluate, based on the vehicle pose information and the sensor pose information, whether a segment between a given one of the one or more sensors and a received point from a selected one of the return signals crosses any surface of a 3D model of the vehicle. Upon determining that the received point from the selected return signal crosses any surface of the 3D model of the vehicle, at block 710 the process includes identifying the received point as a self-return point. And at block 712, in response to identifying the received point as a self-return point, the vehicle performs a selected operation while in the autonomous driving mode. This can include discarding or flagging the self-return point so that this information is not used for object detection and/or recognition, so that the vehicle can make corresponding driving decisions.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
 determining, by one or more processors of a vehicle, vehicle pose information for the vehicle at a given point in time while the vehicle operates in an autonomous driving mode;
 determining, by one or more processors of the vehicle, sensor pose information for one or more sensors of a perception system of the vehicle at the given point in time, wherein the sensor pose information includes a respective position and a respective orientation of the one or more sensors relative to a fixed point or a part of the vehicle;
 receiving, by the one or more sensors, return signals from one or more scans taken of an external environment around the vehicle, wherein at least one of the return signals is reflected off of one or more objects that are not part of the vehicle;

evaluating, by the one or more processors of the vehicle based on the vehicle pose information and the sensor pose information, whether a segment between a given one of the one or more sensors and a received point from a selected one of the return signals crosses any surface of a 3D model of the vehicle;

upon determining that the received point from the selected return signal crosses any surface of the 3D model of the vehicle, identifying the received point as a self-return point; and in response to identifying the received point as a self-return point, the vehicle performing a selected operation while in the autonomous driving mode.

2. The method of claim 1, wherein the selected operation includes discarding the self-return point from a data set of the received return signals.

3. The method of claim 1, wherein the selected operation includes flagging the self-return point as being a self-return and storing the flagged point in memory.

4. The method of claim 1, wherein the 3D model of the vehicle is a static model when the vehicle is not an articulating vehicle.

5. The method of claim 4, wherein evaluating whether the segment between a given one of the one or more sensors and the received point from the selected one of the return signals crosses any surface of the 3D model includes evaluating the static model using a lookup table that includes yaw and pitch direction.

6. The method of claim 1, wherein the 3D model of the vehicle is a dynamic or kinematic model when the vehicle is an articulating vehicle.

7. The method of claim 6, further comprising using a set of the return signals to estimate trailer orientation of the articulating vehicle.

8. The method of claim 1, wherein the one or more sensors are lidar sensors performing the one or more scans taken of the external environment around the vehicle.

9. The method of claim 8, wherein the one or more lidar sensors rotate to provide a field of view of up to 360° around the vehicle.

10. The method of claim 1, wherein performing the selected operation includes identifying a surface or region of the vehicle as a hot spot likely to cause self-reflections of one or more of the return signals.

11. The method of claim 1, wherein the 3D model of the vehicle includes a buffer around one or more portions of the vehicle.

12. The method of claim 11, wherein the buffer depends on a range precision for one or more of the sensors of the perception system of the vehicle.

13. A vehicle comprising:

a driving system including a steering subsystem, an acceleration subsystem and a deceleration subsystem to control driving of the vehicle when operating in an autonomous driving mode;

a perception system configured to detect objects in an environment external to the vehicle, the perception system including one or more sensors; and a control system including one or more processors, the control system operatively coupled to the driving system and the perception system, the control system being configured, while the vehicle is operating in the autonomous driving mode, to:

determine vehicle pose information for the vehicle at a given point in time while operating in the autonomous driving mode;

determine sensor pose information for the one or more sensors of the perception system of the vehicle at the given point in time, wherein the sensor pose information includes a respective position and a respective orientation of the one or more sensors relative to a fixed point or a part of the vehicle;

receive return signals from one or more scans taken of an external environment around the vehicle, wherein at least one of the return signals is reflected off of one or more objects that are not part of the vehicle;

evaluate, based on the vehicle pose information and the sensor pose information, whether a segment between a given one of the one or more sensors and a received point from a selected one of the return signals crosses any surface of a 3D model of the vehicle;

upon a determination that the received point from the selected return signal crosses any surface of the 3D model of the vehicle, identify the received point as a self-return point; and in response to identifying the received point as a self-return point, cause the driving system of the vehicle to perform a selected operation while in the autonomous driving mode.

14. The vehicle of claim 13, wherein the selected operation includes discarding the self-return point from a data set of the return signals.

15. The vehicle of claim 13, wherein the one or more sensors of the perception system are lidar sensors configured to take the one or more scans of the external environment around the vehicle.

16. The vehicle of claim 15, wherein the one or more lidar sensors are positioned along a roof section of the vehicle and are configured to rotate to provide a field of view of up to 360° around the vehicle.

17. The vehicle of claim 13, wherein the one or more processors include a processing element of the one or more sensors, the processing element being configured to perform the evaluation of whether the segment between a given one of the one or more sensors and the received point from the selected one of the return signals crosses any surface of the 3D model of the vehicle.

18. The vehicle of claim 13, wherein the vehicle is not an articulating vehicle and the 3D model of the vehicle is a static model.

19. The vehicle of claim 13, wherein the vehicle is an articulating vehicle and the 3D model of the vehicle is a dynamic or kinematic model.

20. The vehicle of claim 13, wherein the 3D model of the vehicle includes a buffer around one or more portions of the vehicle.

* * * * *